No. 740,345. PATENTED SEPT. 29, 1903.
C. F. WILKINS & F. A. GARRETT.
BEARING FOR DISKS.
APPLICATION FILED DEC. 22, 1902.
NO MODEL.
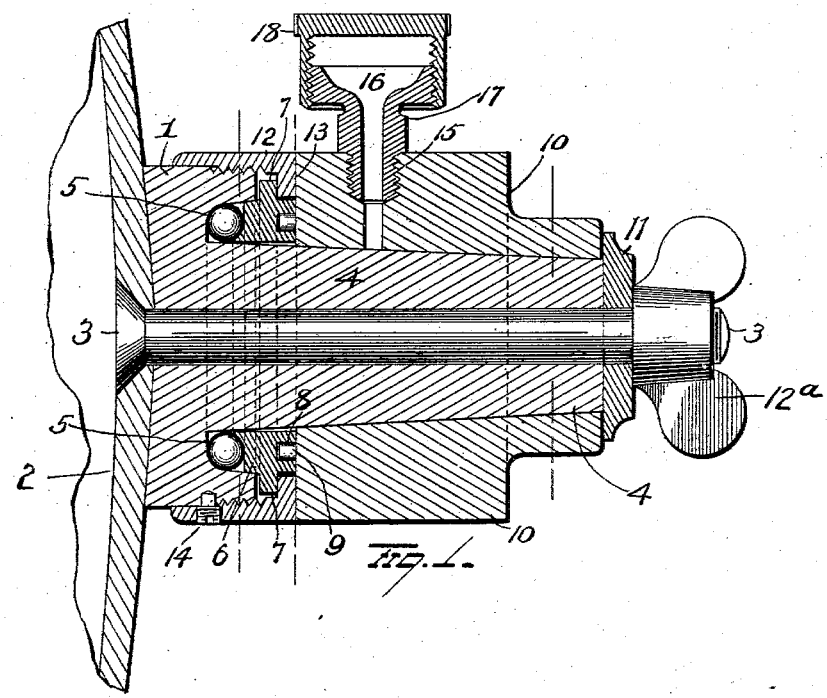
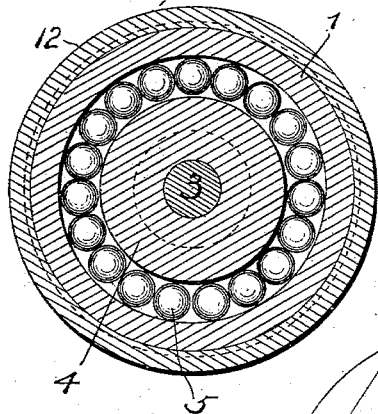
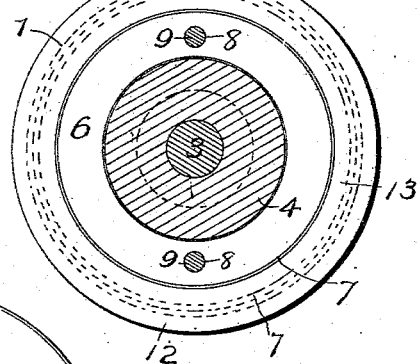
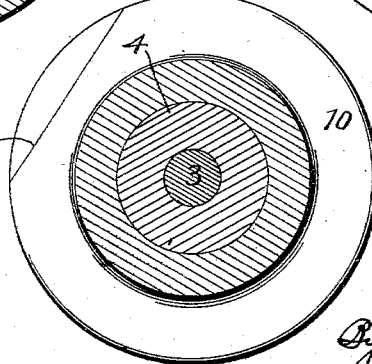
WITNESSES
E. J. Nottingham
G. F. Downing
INVENTORS
C. F. Wilkins and
F. A. Garrett
By H. A. Seymour
Attorney No. 740,345. Patented September 29, 1903.

UNITED STATES PATENT OFFICE.

CHARLES F. WILKINS, OF HUTCHINSON, AND FRED A. GARRETT, OF HEIZER, KANSAS.

BEARING FOR DISKS.

SPECIFICATION forming part of Letters Patent No. 740,345, dated September 29, 1903.

Application filed December 22, 1902. Serial No. 136,262. (No model.)

*To all whom it may concern:*

Be it known that we, CHARLES F. WILKINS, of Hutchinson, county of Reno, and FRED A. GARRETT, of Heizer, in the county of Barton, State of Kansas, have invented certain new and useful Improvements in Bearings for Disks; and we do hereby declare the following to be a full, clear, and exact description of the invention, such as will enable others skilled in the art to which it appertains to make and use the same.

Our invention relates to an improved bearing for disks, and more particularly for the disks of cultivators and the like, the object of the invention being to provide improvements of this character which will insure the easy rotation of the disk, and thereby reduce draft and improve the operation of the implement, and, further, to provide an improved bearing which can be most effectually lubricated and which can be readily taken apart and assembled.

With these objects in view the invention consists in certain novel features of construction and combinations and arrangements of parts, as will be more fully hereinafter described, and pointed out in the claims.

In the accompanying drawings, Figure 1 is a view in section, illustrating our improvements; and Figs. 2, 3, and 4 are other sectional views thereof.

1 represents a cylindrical block having a concave face, against which the disk 2 is secured by means of a bolt 3, passed through a central opening in the block and through a conical extension or journal 4 thereon. In the opposite side of block 1, around the journal 4, a deep groove is provided and constitutes a runway for balls or rollers 5. A ring 6, having a flange 7 thereon to limit its inward movement, is made with a concave face to rest against balls or rollers 5 and permit the block to turn freely. This ring 6 is made with notches or sockets 8 in its face to receive projections or pins 9 on the end of a bearing-sleeve 10, which latter is made with a conical bore to receive the journal 4 and provide a bearing therefor. The sleeve 10 is also made with a flat face $10^a$ to permit the application of a wrench. A washer 11 is located on bolt 3 and against the contracted end of bearing-sleeve 10, and when a set-nut $12^a$ is screwed onto the bolt and against the washer the parts will be effectually held together and in operative relation to each other. Block 1 is externally screw-threaded to receive an internally-threaded ring 12, which latter is provided at one end with an internal flange or shoulder 13 to overlap the flange 7 of ring 6 and prevent displacement of the latter and also prevent the entrance of dirt and grit to the bearing. Alined openings are provided in ring 12 and block 1 for the reception of a screw 14 to effectually lock the ring against independent turning.

Bearing-sleeve 10 is provided with a threaded opening to receive a threaded tube 15, forming a part of a lubricant-cup. This tube is integral with the externally-threaded bottom 16 of the cup and is made with an angular enlargement 17 for the reception of a wrench to screw the same tightly into the opening in the bearing-sleeve 10. Onto this bottom 16 an internally-screw-threaded cup 18 is screwed and is adapted to contain hard lubricant and force it through the tube 15 into the bearing.

A great many changes might be made in the general form and arrangement of the parts described without departing from our invention, and hence we do not confine ourselves to the precise construction set forth, but consider ourselves at liberty to make such slight changes and alterations as fairly fall within the spirit and scope of our invention.

Having fully described our invention, what we claim as new, and desire to secure by Letters Patent, is—

1. The combination with a disk, a block secured thereto and having an annular recess, and a sleeve in which said block is mounted, of a separate ring keyed to one end of said sleeve and having a bearing-face for balls, and balls between the bearing-face of said ring and the annular recess in the block.

2. The combination with a disk, a block secured thereto having an annular recess, balls in said recess and a sleeve in which said block is mounted, of a separate bearing-ring keyed to one end of said sleeve and bearing against said balls and a ring secured to said block and having moving engagement with said separate bearing-ring.

3. In a bearing for the disks of cultivators and the like, the combination with a bearing-sleeve having a conical bore, of a block adapted to have a disk secured thereto, a conical journal on said block, supported in the bearing-sleeve, said block having an annular recess, balls therein, a ring bearing against the balls, and locking means between the ring and bearing-sleeve.

4. In a bearing for the disks of cultivators and the like, the combination with a bearing-sleeve having a conical bore, of a block having a conical journal to fit the bearing-sleeve, and said block and journal made with a central opening, a bolt passing through said central opening to secure a disk to one face of the block, balls having a runway in the block, a ring engaging the balls, a retaining-ring screwed onto the block and holding the ring on the bearing-balls, pins on the bearing-sleeve to enter sockets in the ring, and a lubricant-cup on the bearing-sleeve and adapted to supply lubricant to the conical journal.

5. In a bearing for the disks of cultivators and the like, the combination with a bearing-sleeve having a conical bore, of a block having a conical journal to fit the bearing-sleeve, a bolt passed through the block and journal and adapted to secure a disk to one face of the block, balls mounted in an annular groove in the block around the journal, a ring to run on said balls, means for locking said ring to the bearing-sleeve, a retaining-ring screwed onto the block and engaging the ring to hold it in place against the balls.

In testimony whereof we have signed this specification in the presence of the subscribing witnesses.

CHARLES F. WILKINS.
FRED A. GARRETT.

Witnesses as to the signature of Charles F. Wilkins:
J. B. SWEET,
CHARLES ROZELL.

Witnesses as to the signature of Fred A. Garrett:
LYMAN G. RINDGE,
FRANK TALLMAN.